March 16, 1954 F. ADAMS 2,672,015
HYDRAULIC BRAKE BOOSTER
Filed July 10, 1947 4 Sheets-Sheet 1

INVENTOR.
FRANK ADAMS
BY
Wheeler, Wheeler + Wheeler
ATTORNEYS

March 16, 1954  F. ADAMS  2,672,015
HYDRAULIC BRAKE BOOSTER

Filed July 10, 1947  4 Sheets-Sheet 2

INVENTOR.
FRANK ADAMS
BY
Wheeler, Wheeler & Wheeler
ATTORNEYS

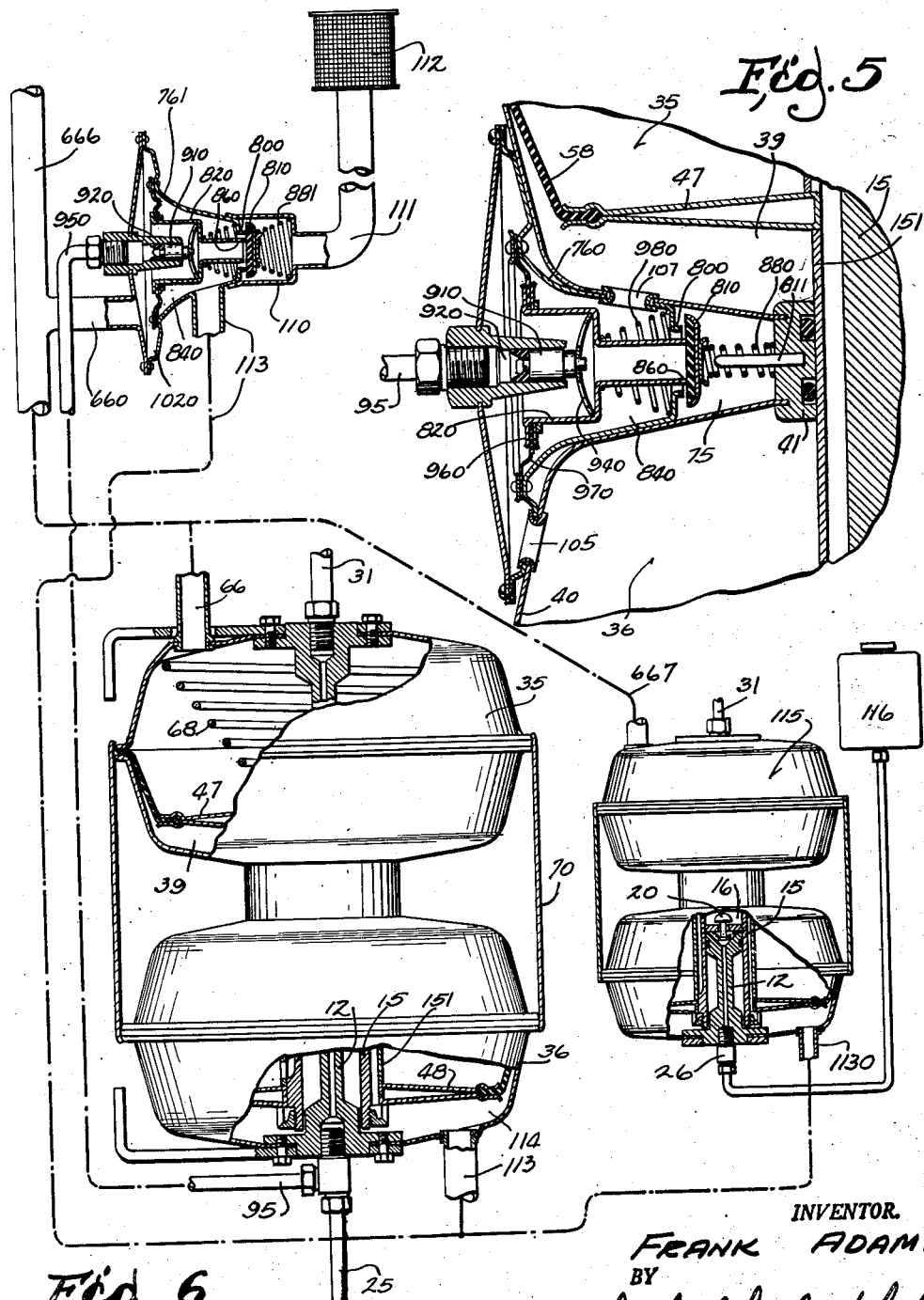

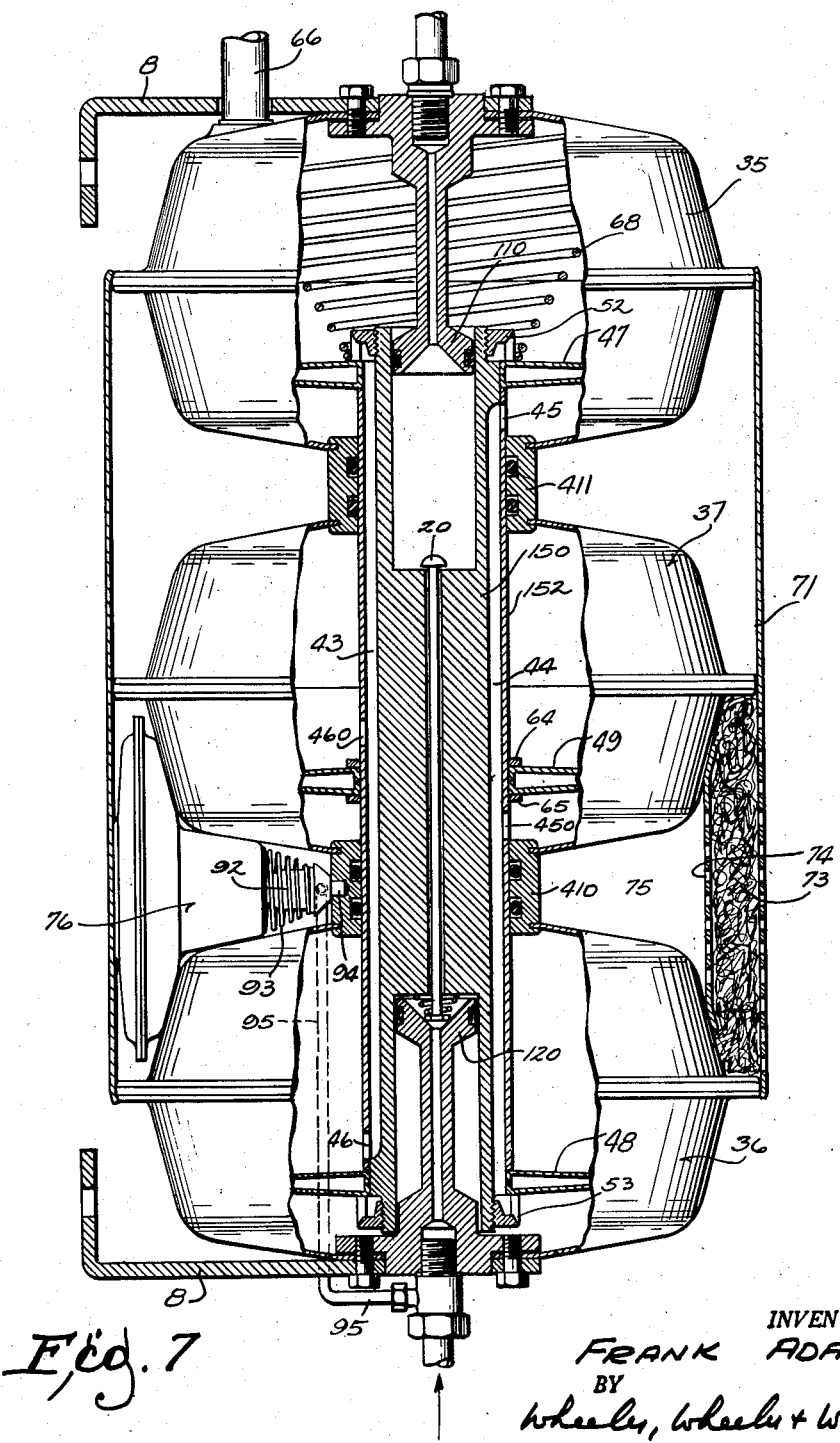

Patented Mar. 16, 1954

2,672,015

UNITED STATES PATENT OFFICE 2,672,015

HYDRAULIC BRAKE BOOSTER

Frank Adams, Milwaukee, Wis.

Application July 10, 1947, Serial No. 760,087

28 Claims. (Cl. 60—54.5)

This invention relates to improvements in hydraulic brake boosters, such as employ pneumatic pressure differentials, subject to brake pedal control to augment the braking pressure developed by the pedal.

It is a primary object of the invention to simplify and render compact a multiple cylinder brake booster, minimizing and standardizing parts to facilitate manufacture.

It is a further object of the invention to be able, if desired, to eliminate external piping almost completely, accommodating within the interior of the apparatus almost all of the passages which place the high pressure and low pressure chambers of the multiple cylinders in communication with each other.

It is a further object of the invention to provide a novel and improved organization which can be used in any position and in which, notwithstanding the great amount of auxiliary power provided by the multiple pneumatic cylinders, the operator is given, at all times, the "feel" of the brake so that the resistance to his foot pressure is a constant gage of the degree of braking action.

Other objects will appear more specifically upon analysis of the following disclosure of the invention.

In the drawings:

Figure 5 is a fragmentary view in section showing a modified arrangement of the control casing and its valves.

Figure 6 is a view partially in elevation and partially in section showing on a reduced scale and partially in diagrammatic form a modification of the device of Figure 1 in which the control casing is entirely removed from the booster cylinder assembly.

Figure 7 is a view partially in section and partially in side elevation showing a modified embodiment of the invention.

Figure 1:
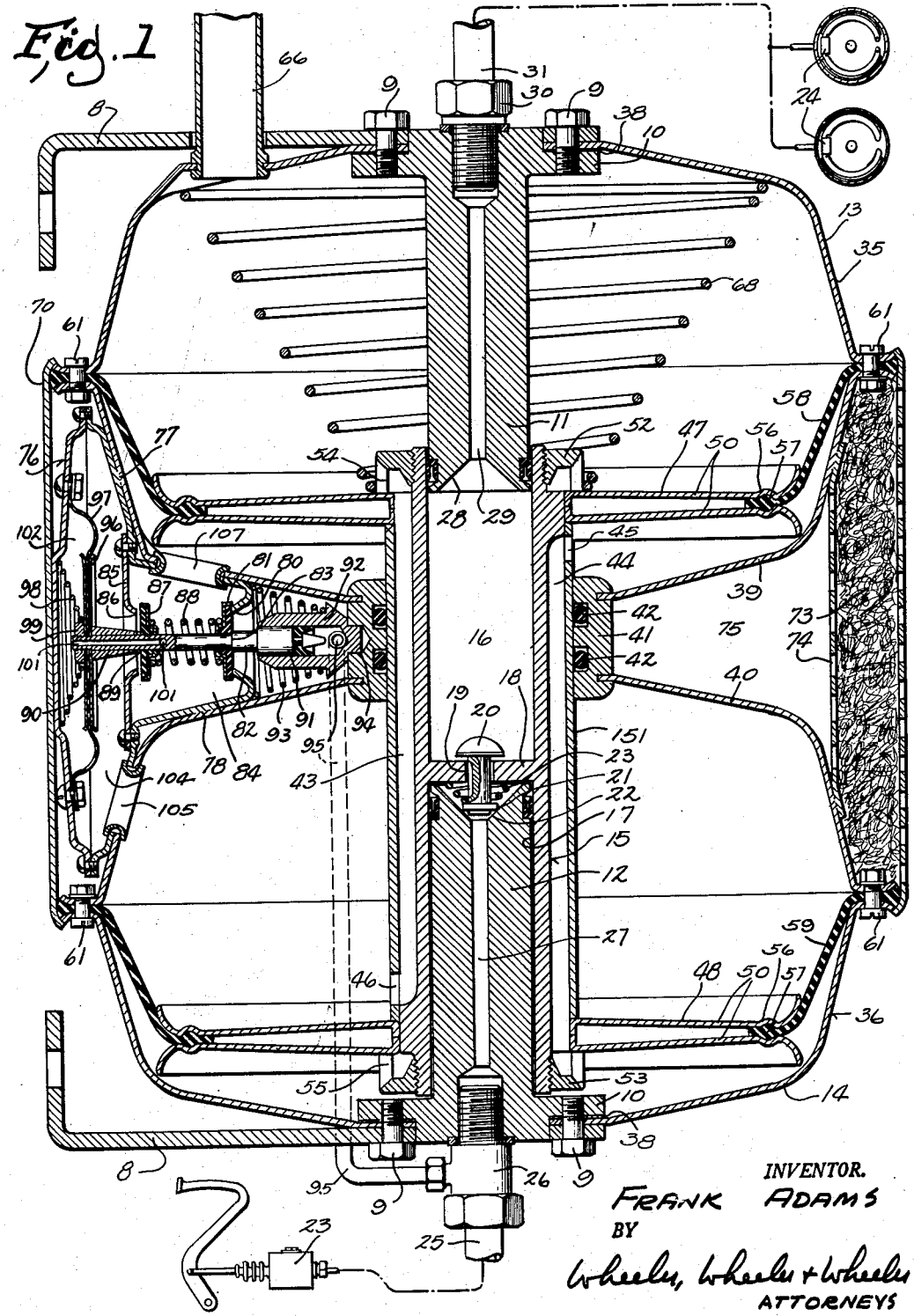
Figure 1 is a view in axial section through a device embodying the invention.

Between the mounting brackets 8 any desired number of pneumatic cylinders are assembled with communications in parallel subject to automatic control as hereinafter described. The mechanical assembly is as follows:

Connected by cap screws 9 to the respective brackets are the shouldered heads 10 of aligned stationary pistons 11, 12. Guided upon these for axial reciprocation is the floating hydraulic cylinder member 15 which has cylinders 16, 17, opening to its respective ends and in which the stationary pistons 11 and 12 operate with suitable packing as shown. The floating cylinder member 15 has a transverse partition 18 between the cylinders 16, 17. There is a valve port 19 affording communication between the cylinders subject to the control of a valve 20, the stem of which extends loosely through port 19 and is provided at 21 with a collar which, in the position of the parts illustrated in Figure 1, is engaged by the tapered wall of a recess 22 in the end of stationary piston 12. The periphery of the collar 21 is polygonal so that it may engage the wall of recess 22 without precluding free communication past the collar. The compression spring 23 acts upon the collar in a direction such as to tend to seat the valve 20 to close port 19 save when the valve is held open by engagement of the collar with piston 12 when the piston is fully received into its cylinder 17.

The cylinders 16, 17 form a part of the hydraulic circuit between the diagrammatically illustrated master cylinder 23 and the brake cylinders 24. The pipe 25 communicates with the master cylinder 23 through fitting 26 and duct 27 which opens into the recess 22 of piston 12. A similar recess 28 in the end of piston 11 opens into duct 29 which communicates through fitting 30 with pipe 31 with the valve cylinder or cylinders 24 of the brake system. When the floating cylinder member 15 is in the position illustrated in Figure 1, the valve 20 is forced open to equalize hydraulic pressures throughout the hydraulic system. In this position of the parts any additional pressure imposed on the master cylinder by manipulation of the brake pedal will be communicated in the usual way through pipe 25, duct 27, cylinder 17, port 19, cylinder 16, duct 29 and pipe 31 to the brake cylinders. Upon relief of pressure on the brake pedal, the oil will return from the brake line 31 toward the master cylinder in like manner.

Surrounding the hydraulic system as above described, I provide between the brackets 8 any desired number of pneumatic cylinders. I have shown two such cylinders in Figure 1 and three in Figure 7. It will be evident that more may be provided as needed. The pneumatic cylinders 35, 36, 37 (the latter being shown only in Figure 7 and being typical of any desired number of added cylinders) may conveniently be made of cup-shaped stampings marginally secured together. The cup-shaped elements 13, 14 at the ends of the series may conveniently be held by the cap screws 9 to brackets 8, suitable packing being preferably provided at 38. The complementary cup-shaped elements 39, 40 may conveniently have their inner margins anchored in a spacer ring 41 which is provided at 42 with suitable packing engaging the periphery of a sleeve 151 which is brazed or otherwise secured peripherally to the floating cylinder member 15 to complete the enclosure of passages provided by the alternating slots 43, 44, cut longitudinally in the exterior surface of such member. The slots 43 all open toward the end of member 15 which is uppermost as viewed in Figure 1 while slots 44 all open only toward the end of member 15 which is lowermost in Figure 1. The sleeve 151 has openings 45 registering with the blind ends of slots 44. The sleeve has openings at 46 communicating with the blind ends of the passages 43.

In each of the pneumatic cylinders, there is a diaphragm-packed piston 47, 48, 49 (the latter appearing only in Figure 7). Each piston preferably comprises a pair of like stampings 50. In the case of the pneumatic cylinders 35 and 36, the stampings 50 are clamped against the ends of the sleeve 151 by nuts 52, 53 which are threaded to the floating cylinder member 15 and are notched at 54 to communicate with the open ends of passages 43 and at 55 to communicate with the open ends of passages 44, respectively. Suitable channels at 56 in the piston elements 50 receive the annular beads or ribs 57 with which the diaphragms 58, 59 are provided. The exterior peripheral margins of the respective diaphragms are clamped between the cup-shaped stampings 13, 39 which make up pneumatic cylinder 35 and the corresponding stampings 14, 40 which make up pneumatic cylinder 36, the assembly being maintained by bolts 61.

In Figure 7, the central pneumatic cylinder 37 typifies the manner in which any desired number of additional cylinders may be introduced between cylinders 35 and 36, the floating cylinder member 150 and its sleeve 152 and the stem of valve 20 being lengthened accordingly. As many spacer rings 410, 411, as may be required, are used to provide mechanical connection between the respective pneumatic cylinders. Each ring has a packed bearing through which the hydraulic cylinder and sleeve are unitarily slidable. To the reciprocable cylinder member 150 and its sleeve 152, the pistons 47 and 48 in the terminal pneumatic cylinders 35 and 36 are attached by nuts 52, 53 in the manner already described. The piston or pistons 49 of any intervening pneumatic cylinder or cylinders may be mounted between collars 64, 65 fixed upon the exterior of sleeve 152. For each intermediate pneumatic cylinder, orifices 450 in sleeve 152 will afford communication to the passages 44, while orifices 460 will afford communication at the other side of the piston, with passages 43. Thru passages 43 and 44, corresponding portions of all cylinders are in communication.

Thus, regardless of how many pneumatic cylinders may be incorporated in the assembly, such cylinders comprise a substantially rigid unit extending between the brackets 8 and the reciprocable floating cylinder member 15 extends through all of the pneumatic cylinders in the series and is telescopically guided on the pistons fixed at the terminals in the series.

While the pneumatic cylinders may be regarded as mechanically connected in series, their pneumatic connection is in parallel. It is this fact which makes it possible to add pneumatic cylinders as may be desired to multiply the braking power exerted. In Figure 7 pistons 110, 120 fixed to the brackets 8, are identical with those shown at 11 and 12 in Figure 1 save that they have been reduced in weight by cutting them away peripherally, a feature which may likewise be adopted in the case of the pistons 11 and 12 if desired.

A vacuum line 66 connects to the low pressure side of the piston in one of the pneumatic cylinders. The preferred connection is through the cup-shaped element 13 of the pneumatic cylinder 35. The compression spring 68 which acts on the floating cylinder member 15 and the pistons connected therewith is also preferably located in this cylinder, although it may be elsewhere. Through the notches 54 of nut 52 and by means of the longitudinally extending slots or passages 43 and the orifices 46 or 460, the low pressure chamber of pneumatic cylinder 35 is placed in communication with the low pressure chambers of each and every other pneumatic cylinder in the series. By means of the notches 55 of nut 53 and the communicating channels or passages 44, the high pressure chambers of the respective pneumatic cylinders are all in communication. Thus the pressures on the corresponding faces of the several pneumatic pistons 47, 48 and 49 are equalized throughout the series of pneumatic cylinders.

Whether two or more pneumatic cylinders are employed, they are preferably encircled by a band 70, 71, a portion of which is foraminous, as shown in Figures 1, 2, 3 and 7 to admit atmospheric air through the arcuate filter body 73 and the inner foraminous wall 74 to an air chamber 75 conveniently located between two of the pneumatic cylinders. The filter body 73, which may be of any suitable material, frees from dust and water the atmospheric air admitted to the air chamber 75.

Figure 2:
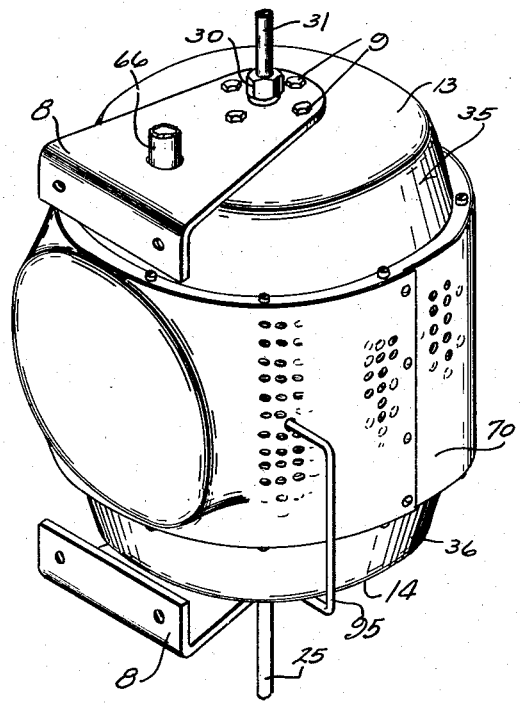
Figure 2 is a perspective view on a reduced scale showing the external appearance of the apparatus illustrated in Figure 1.
Figure 3:
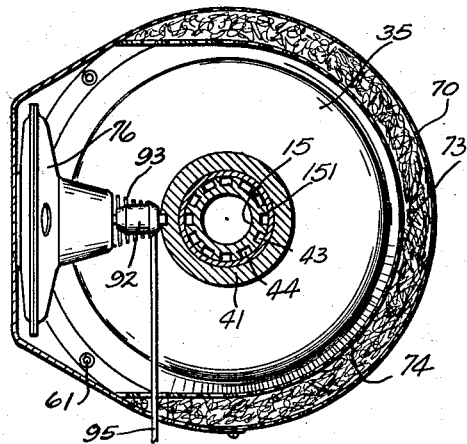
Figure 3 is a detail view on a reduced scale taken transversely through the apparatus of Figure 1.
Figure 4:
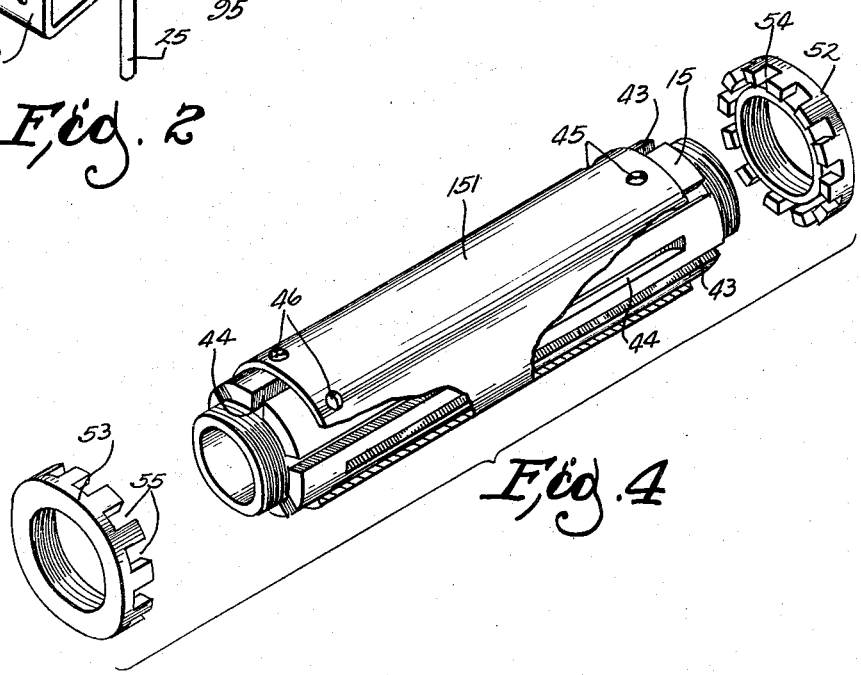
Figure 4 is an enlarged detail view in perspective showing the communication tube of the apparatus with portions broken away to expose interior parts.

Disposed in the air chamber between such cylinders is the valve control casing generically designated by reference character 76, for which the shell 70 may be embossed outwardly in the manner shown in Figure 2. This casing is mounted in any convenient manner. For example, I have shown it in Figure 1 to be welded at 77 to the cup-shaped element 39 of air cylinder 35 and it is also welded at 78 to the cup-shaped element 40 of pneumatic cylinder 36 (in the case of the device shown in Figure 7, the connection is made to pneumatic cylinder 37 instead of pneumatic cylinder 35).

At the smaller end of the control casing 76 is an air inlet port 80 controlled by a valve 81 slidably mounted on a connecting rod 82 shouldered at 83. When valve 81 is open, port 80 provides communication from air chamber 75 to control chamber 84 which is formed by a partition 85 across the casing 76. In the partition is another valve port at 86 controlled by a valve 87, likewise slidable upon the connecting rod 82. A compression spring 88 seated against the respective valves 81, 87 biases them oppositely toward their respective seats to the extent permitted by the respective shoulders 83 and 89, the latter being provided by a fitting 90 mounted on the connecting rod 82 which serves as the valve stem for both valves and permits sliding movement of the respective valves to and from the shoulders which limit the opposite extremes of such movement.

At the inner end of connecting rod 82 is a piston 91 which operates in a cylinder 92 held by compression spring 93 in a socket 94 formed in one of the spacer rings 41 (or 410). Pipe 95 leads from the interior of cylinder 92 to the hydraulic pressure inlet fitting 26 whereby the control cylinder is placed in communication with the master brake cylinder.

At the end of connecting rod 82 opposite piston 91, the connecting rod has attached to it a diaphragm piston 96 packed by diaphragm 97 and biased by spring 98. The nut 99 holds the diaphragm piston 96 to the fitting 90 on the end of the valve stem. A duct 101 leads through the stem from the control chamber 84 to the back pressure chamber 102 in which compression spring 98 is located.

Operation is as follows:

It may be assumed that the booster device herein disclosed is employed to control the brakes of a vehicle whose engine (not shown) is in operation. Through connection to the intake manifold of such an engine (or any other low pressure source), air is constantly being withdrawn through pipe 66 from the low pressure side of the several pneumatic cylinders. If there is no braking pressure being exerted on the master cylinder, there will be no hydraulic pressure in line 25 or line 95 communicating therewith. Under these circumstances, the spring 98 in the control casing 76 will urge the connecting rod 82 and its associated parts to the right as viewed in Figure 1, with the result that valve 81 will be seated and valve 87 will be opened.

Through the eyelet seal 105 the chamber 104 in regulating casing 76 is in communication with the low pressure portion of pneumatic cylinder 36 and, through ducts 43, with the low pressure portions of all of the other pneumatic cylinders. Thus, when valve 87 is open, the partial vacuum existing in the low pressure portions of the several cylinders is communicated through port 86 to the regulating chamber 84 and thence through the eyelet seal 107 to the high pressure portion of pneumatic cylinder 35 (or cylinder 37 in the case of Figure 7) which, through the passages 44, is in communication with the high pressure portions of all of the other cylinders. Under the stated conditions, therefore, pressures on both sides of each of the pneumatic pistons 47, 48, 49 are balanced throughout the pneumatic cylinders and the floating cylinder 15 (150 in the case of Figure 7) is held by spring 68 in the position shown in Figures 1 and 5.

With the floating cylinder 15 (or 150) in the position illustrated in Figures 1 and 7, the contact of collar 21 with the end of piston 12 forces valve 20 open against the bias of spring 23. In consequence, there is open communication for the hydraulic liquid from the master cylinder line 25 through duct 27, port 19, cylinder 16 and duct 29 to the slave cylinder pipe 31 which leads to the several brake cylinders.

Assuming that pressure is now applied to the brake pedal to establish pressure in the master cylinder 23 and master cylinder line 25, the initial pressure is communicated directly through the open channels aforesaid to the slave cylinder line 31 to initiate response at the brakes. However, pressure is also developed in the branch line 95 which leads to the control cylinder 92. This pressure, acting on piston 91 and connecting rod 82, overcomes the bias of spring 98, closes valve 87 and ultimately opens valve 81.

As valve 87 closes, it cuts off communication between the high pressure sides of the operating cylinders and the low pressure sides thereof, as previously established through the control chamber 84 (which communicates through seal eyelet 107 with the high pressure sides of the several cylinders) and chamber 104 (which communicates by seal eyelet 105 with the low pressure sides of the several pneumatic cylinders). The opening of valve 81 now admits atmospheric air from air chamber 75 through chamber 84 and eyelet 107 and passages 44 to the high pressure sides of the several pneumatic cylinders and establishes a pressure differential on the several pistons 47, 48, 49.

As the atmosperic air continues to be admitted, differential pressure is increased. The pistons and the floating cylinder 15 (150 in the case of Figure 7) advance against the bias of spring 68 to reduce the capacity of the hydraulic cylinder 16 by the entry of the stationary piston 11 to such cylinder. The first advance of the floating cylinder and associated pistons permits valve 20 to close under the bias of its spring 23 so that the liquid displaced from the hydraulic cylinder 16 must escape through duct 29 to the brake cylinder line 31 where its pressure is exerted to operate the several brakes.

Meantime the chamber 102 in the control casing 76, which was originally subject to partial vacuum communicated thereto through duct 101, is now subject to the atmospheric pressure in chamber 84 due to the closing of valve 87 and the opening of valve 81. The chamber 104 remains subject to partial vacuum (via eyelet 105, duct 43, pipe 66) and hence differential pressure is established on the diaphragm piston 96 which is substantially proportioned to the differential pressures to which the pneumatic pistons 47, 48, 49 are subject. As the pressure on the pneumatic pistons increases, so does the pressure on piston 96 increase. This pressure is communicated through connecting rod 82 and piston 91 and the liquid in hydraulic cylinder 92 to pipe 95 and thence back through the master cylinder line 25 to the master cylinder, where it evidences itself upon the brake pedal. Consequently, despite the fact that the valve 20 has cut the master cylinder off from the braking circuit, the operator feels, upon the pedal, a resistance proportioned to the booster effect developed in the apparatus and the sensation in his foot is substantially the same as if the foot were actually effecting the braking operation. His foot being subjected at all times to a resistance comparable to the actual braking pressure, he is able to perceive through his foot the degree of such pressure with substantially the same sensitivity as if the braking operation were being performed directly by the foot pedal instead of through the booster mechanism.

Figure 5 shows a modified control arrangement. The control casing 760 is generally similar in form and location to the control casing 76 previously described. Its smaller end has an annular flange 800 constituting an outwardly directed valve seat with which the valve 810 cooperates. This single valve is made to perform the functions of both of the valves 81 and 87 in the device of Figure 1. It is urged toward its seat 800 by the compression spring 880, guided on a post 811 fixed in the collar 41.

Within the casing 760 the shell 820 floats supported and guided by the diaphragm 970 and by the bridge member 840 which connects the shell with piston 910 in hydraulic cylinder 920. The compression spring 980 seated against an internal shoulder in the casing 760 urges the shell and diaphragm to the left as viewed in Figure 5. (See the position of the parts in Figure 6.)

Shell 820 has a reduced neck portion 860 which may seat against the valve 810 whenever the shell moves to the right in casing 760 against the compression of spring 980. This happens whenever the brake pedal is depressed to deliver pressure from the master cylinder 23 to pipes 25 and 35.

The operation is the same functionally as that already described, although the parts are reversed in their direction of movement. When there is no pressure on the master cylinder the seat portion 860 of shell 820 is retracted from the valve 810, thereby affording communication through the annular seat 860 between the high pressure chambers of the several pneumatic cylinders (via eyelet seal 107) and the low pressure chambers (via eyelet seal 105). When the initial braking pressure is applied, such pressure is communicated through pipe 95 to cylinder 920 thereby forcing piston 910 to the right as viewed in Figure 5. This displaces the shell 820 and its diaphragm until the sleeve which provides seat 860 contacts the valve 810. At this point the communication between the high pressure and the low pressure sides of the several pneumatic cylinders is cut off. Continued movement of the shell to the right with piston 910 will maintain the seal of the valve on seat 860 but will displace the valve 810 from its seat 800 on the stationary casing 760. This places atmospheric air in chamber 75 in communication through seat 800 and eyelet 107 with the high pressure chambers of the several cylinders. Thereupon the pressure differential in such cylinders will displace the pistons therein to exert braking pressure as above described. Figure 5 shows the parts in this position.

Figure 6 is included to demonstrate the fact that it is not necessary that the control mechanism be disposed between the pneumatic cylinders 35 and 36 in the manner suggested in Figures 1 and 5. It can be located at any remote point. Under some circumstances this may be desirable even though it means that the communicating piping will be exposed. This view further demonstrates the fact that inasmuch as the several high pressure and low pressure chambers of the multiple pneumatic cylinders are all in communication, each with the other, the particular point at which the pneumatic connections are made is of relatively little consequence. Where it is desired to control the brakes of one or more trailers, a single control mechanism, remotely located, as suggested in Figure 6, can obviously be used to regulate the operation of any desired number of boosters or slave motors provided the necessary branch pneumatic connections are made.

In the device of Figure 6 the casing 761, except for the fact that it is definitely located and has no eyelet seals 105 and 107, is identical with the casing 760 of Figure 5. The same valve seats and valves are provided. However the valve 810, instead of being located in an air chamber 75 between two cylinders is now disposed in an air chamber 110 and supported by a spring 881. A pipe 111 connected with air cleaner 112 admits atmospheric air to chamber 110.

The chamber 840 within casing 761 is connected by pipe 113 with the high pressure chamber 114 or any one or more of the booster cylinders or slave motors. Chamber 1020, instead of being connected directly with the low pressure chambers of any one of the cylinders is simply connected by branch pipe 660 with the vacuum line 666, through which it is in communication with all of the low pressure chambers. The operation is exactly the same as above described. Moreover, it will be understood that the type of control mechanism shown in Figure 1 is also usable in a remote location in the manner suggested in Figure 6.

The slave motor 115 shown in Figure 6 is identical with any one of the boosters heretofore described except that, being a slave motor and remote from any braking pedal operation, it requires no hydraulic connection at 26 except to the reserve oil tank 116 communication with which is controlled by the check valve 29. Branch vacuum and air connections are provided at 667 and 1130 from pipes 666 and 113 respectively. Such a slave motor will develop hydraulic pressure in cylinder 16 and apply such pressure through its own brake line 31 in unison with the operation of the main booster as regulated by the control mechanism, whether integrated or remotely located. While the size of the slave motor 115 has been reduced for diagrammatic illustration, it will be understood that it may have any desired size.

I claim:

1. In a device of the character described, the combination with a plurality of pneumatic cylinders connected end to end in series, of a stationary hydraulic piston within one of said pneumatic cylinders having a face and an internal conduit opening through the piston from said face, a hydraulic cylinder reciprocable within said pneumatic cylinders and guided in part on said hydraulic piston, and a pneumatic piston in each of said pneumatic cylinders, said pneumatic pistons being connected with said hydraulic cylinder to reciprocate in unison therewith, said pneumatic pistons dividing the respective pneumatic cylinders into high and low pressure chambers, and passages extending through the hydraulic cylinder and opening into the respective corresponding chambers of said pneumatic cylinders, thereby placing the respective high pressure chambers of said pneumatic cylinders in communication with each other and the respective low pressure chambers of said pneumatic cylinders in communication with each other.

2. In a device of the character described, a floating hydraulic cylinder member provided interiorly with a cylinder cavity and with longitudinally extending passages externally of said cavity, a first pneumatic piston mounted on said member and through which at least one of said passage opens, a second pneumatic piston mounted on said member remote from the first and through which a different passage opens, the first mentioned passage opening through said member adjacent said second piston, and the second passage opening through said member adjacent the first piston, a first pneumatic cylinder in which said first piston is operable, a hydraulic piston disposed in said pneumatic cylinder and co-acting with the cylinder cavity of said member, and a second pneumatic cylinder in which the second pneumatic piston is operable, each of said pneumatic pistons having means sealing it regarding its respective pneumatic cylinder, each of the pneumatic cylinders having high pressure and low pressure chambers, and the high pressure chambers of the respective pneumatic cylinders being in communication through one of said passages, and the low pressure chambers of the respective pneumatic chambers communicating with each other through the other of said passages.

3. In combination, a series of pneumatic cylinders, a pneumatic piston operable in each and provided with a seal to its respective cylinder, a power transmitting member to which the respective pneumatic pistons are connected, the pneumatic cylinders of said series having bearing means through which said member is reciprocable, cylinders in said member, said member having a ported partition between said cylinders, a normally seated valve controlling flow through the port of said partition, hydraulic pistons fixed in the terminal pneumatic cylinders of said series and extending toward each other and operatively engaged in the cylinders of said member, one of said hydraulic pistons having a portion in the path of said valve for the unseating thereof at an extreme position of said member, a spring biasing said member toward said extreme position, and hydraulic connection to the respective hydraulic pistons, each of said hydraulic pistons having a passage affording communication between the hydraulic connections and the cylinders of said member.

4. In combination, a series of pneumatic cylinders, a pneumatic piston operable in each and provided with a seal to its respective cylinder, a power transmitting member to which the respective pneumatic pistons are connected, the pneumatic cylinders of said series having bearing means through which said member is reciprocable, cylinders in said member, said member having a ported partition between said cylinders, a normally seated valve controlling flow through the port of said partition, hydraulic pistons fixed in the terminal pneumatic cylinders of said series and extending toward each other and operatively engaged in the cylinders of said member, one of said hydraulic pistons having a portion in the path of said valve for the unseating thereof at an extreme position of said member, a spring biasing said member toward said extreme position, and hydraulic connections to the respective hydraulic pistons, each of said hydraulic pistons having a passage affording communication between the hydraulic connections and the cylinders of said member, together with hydraulically operable valve mechanism for controlling differential pressures in the pneumatic cylinders whereby to effect piston movement therein to actuate said member.

5. The device of claim 4 in which said pneumatic pistons divide said pneumatic cylinders into corresponding chambers, said member being provided with longitudinally extending passages opening into respectively corresponding chambers of the respective pneumatic cylinders whereby relative pressure differentials in each thereof will correspond.

6. The combination set forth in claim 4 in which said pneumatic pistons divide said pneumatic cylinders into corresponding chambers, said corresponding chambers of the respective pneumatic cylinders being provided with communicating passages, said control mechanism comprising a vacuum connection communicating with said pneumatic cylinders at corresponding sides of the pistons therein, valve means whereby said chambers of the respective cylinders at the opposite sides of their respective pistons may selectively be placed in communication either with said vacuum connection or with the atmosphere, and a branch hydraulic pressure line communicating with the hydraulic passage in the hydraulic piston having the valve displacing portion, said hydraulic line including a further piston operatively connected with said last mentioned valve means for the actuation thereof.

7. In a device of the character described, a plurality of pneumatic cylinders each comprising a pair of pans peripherally flanged and dished in opposite directions, a bearing collar connecting contiguous pans in the series, a piston fitting in each of the terminal pans of the series, each fitting having a piston projecting axially within the series, and each piston having a conduit opening therethrough externally of the series, a pressure input line connected with the conduit of one of said pistons and a pressure delivery line connected with the conduit of the other, a floating cylinder member extending through the bearing collar and provided with oppositely opening cylinder chambers in which the respective pistons are telescopically slideable, said member having a transverse partition between said cylinder chambers and provided with a port, a valve controlling said port said valve being provided with a projecting stem and the piston having its passage connected with the pressure input conduit being provided with means against which said stem abuts when said partition approaches said piston to unseat said valve, pneumatic pistons in the respective pneumatic cylinders, each of said pneumatic pistons having an annular diaphragm seal peripherally engaged between the flanges of the pans of its respective pneumatic cylinder, the said pneumatic pistons being mounted at spaced points on said member, and said member having longitudinal passages, one of which extends through one of said pneumatic pistons, and the other of which extends through the other of said pneumatic pistons, each of said passages extending through said bearing collar and opening into the next pneumatic cylinder between said collar and the pneumatic piston in the pneumatic cylinder in which said passage opens.

8. In a device of the character described, the combination of a series of pneumatic cylinder shells, bearing collar means connecting contiguous portions of the shells in said series, a hydraulic displacement member reciprocable through said bearing collar means, pneumatic pistons in the respective shells mounted on said member and provided with sealing connection with their respective shells, said pneumatic pistons defining corresponding chambers and opposing corresponding chambers in said shells, and means for developing and regulating pneumatic pressure differential between said corresponding chambers and said opposing corresponding chambers whereby to effect pneumatic piston movement in said shells, the said chambers of said shells having conduit connections placing said corresponding chambers and said opposing corresponding chambers in communication with each other throughout the series, said conduit connections comprising passages extending longitudinally through said member.

9. The combination set forth in claim 8 in which the pressure regulating means comprises a vacuum connection to corresponding chambers of the several shells, a port communicating with the opposing corresponding chambers of the respective shells, a regulating chamber with which said port communicates, said regulating chamber having wall portions provided with high pressure and low pressure ports, valve means mounted for movement respecting said wall portions for the selected opening and closing of the respective ports last mentioned in alternation, and a hydraulic pressure line and piston operatively connected for effecting relative movement between said valve means and the ports last mentioned.

10. In a hydraulic brake booster in which manually developed hydraulic pressure operates control mechanism to vary the pressure differential in a plurality of pneumatic cylinders in which pneumatic pistons operate to provide power for the operation of a hydraulic brake, the combination of a plurality of pneumatic cylinders comprising shells connected in series, bearing collar means connecting contiguous shells in said series, a hydraulic pressure developing member reciprocable through said bearing means within the series, and a control casing between said shells and comprising a pressure chamber having a first port communicating with first portions of the respective shells, and a second port communicating with second portions of the respective shells, and a third port communicating with the atmosphere, valve means controlling the second and third ports and disposed within the casing and hydraulic connections for the operation of said valve means.

11. In a device of the character described, the combination with pneumatic cylinder shells connected in series, of a band encircling peripheral portions of said shells and defining an air chamber therebetween, and a control casing disposed in said chamber and having a valve controlled port affording communication between said chamber and the interior of said casing.

12. The combination set forth in claim 11 in which said band has foraminous wall and is provided with a filter pad disposed to cleanse air admitted through said wall into said chamber.

13. In combination, a pneumatic cylinder, a pneumatic piston reciprocable therein and dividing said cylinder into high pressure and low pressure chambers, a vacuum connection to the low pressure chamber, a hydraulic displacement member with which said piston is connected to actuate said pneumatic member in accordance with pressure differentials to which said pneumatic piston is subject, a control chamber having a first port communicating with the high pressure chamber of said pneumatic cylinder, a second port communicating with the low pressure chamber of said pneumatic cylinder, and a third port communicating with the atmosphere, valve seats at the second and third ports, valve means relatively movable respecting the seats for the control of the second and third ports, and an actuator connected with said valve means for effecting relative movement between said valve means and said seats in directions to open the second and third ports alternatively, together with a slave motor comprising a pneumatic cylinder, a pneumatic piston dividing said cylinder into high pressure and low pressure chambers, a hydraulic displacement member connected with said pneumatic piston to be actuated thereby, and conduits providing connections between the respective chambers of the slave motor cylinder and the corresponding chambers of the pneumatic cylinder first mentioned, said hydraulic displacement members comprising means inside said pneumatic cylinders for pressurizing hydraulic fluid lines leading outside said pneumatic cylinders.

14. The combination with a pneumatic cylinder and a pneumatic piston reciprocable therein and sub-dividing the cylinder into high and low pressure chambers, of a vacuum connection to one of said chambers, a control casing having a control chamber communicating with the other chamber of said cylinder, said control chamber being provided with opposed ports, one of which communicates with the low pressure chamber, and the other with the atmosphere, valve means reciprocable respecting said ports and opening and closing the respective ports in alternation, said valve means comprising valve seats and an operating rod provided with disks floating on said rod and engageable with said seats in the course of reciprocation of the rod, said seats being spaced sufficiently to allow said disks to seat simultaneously at the opposed ports, and a compression spring interposed between said disks and urging them toward the respective seats.

15. In a device of the character described, a booster cylinder having a piston sub-dividing such cylinder into high pressure and low pressure chambers, in combination with a vacuum connection to one of said chambers, and a control mechanism including a control chamber communicating with the high pressure chamber of said cylinder, said control chamber having a port and valve seat, a valve for said seat, said valve being adapted when open to admit atmosphere through said seat to said control chamber, a second chamber in communication with the low pressure chamber of said cylinder and provided with a seat portion engageable with said valve, and means for effecting relative movement of said second control chamber respecting said first seat for moving the second seat to and from the valve and for displacing the valve from the first seat.

16. Control mechanism of the character described comprising a casing having first and second ports and provided with a seat about the second port, a valve engaging said seat and movable outwardly therefrom, a spring biasing said valve toward its said seat, a shell within said casing and provided with a tubular portion disposed within said second port and provided with a second seat for said valve, means guiding said shell for axial reciprocation through said second port, packing between said shell and said casing whereby to provide a sealed chamber within said casing, and means for reciprocating said shell within said casing through a range which includes one position in which the second seat is spaced from said valve, a second position in which said second seat is engaged with said valve while said valve is engaged with said first seat, and a third position in which said shell has displaced said valve from engagement with said first seat, said chamber being thereby in selective communication either with the atmosphere through said valve, or with the interior of said shell.

17. In a booster mechanism for hydraulic brakes, the combination with a pneumatic cylinder and a piston provided with packing in said cylinder and sub-dividing said cylinder into high pressure and low pressure chambers, a hydraulic brake operating pump including relatively movable piston and cylinder members, one of which is connected with said pneumatic piston to receive motion therefrom for hydraulic displacement to operate a brake, said pneumatic cylinder having a vacuum connection to its low pressure chamber, a regulating device comprising valve means for selectively placing the high pressure chamber in communication selectively with the low pressure chamber and alternatively with the atmosphere, a hydraulic motor including a cylinder and piston, the piston being connected with said valve means for the operation thereof, a diaphragm chamber provided with a diaphragm connected with said motor piston and valve means, said diaphragm chamber being operatively connected with the high pressure chamber aforesaid to be subject to atmospheric pressure when the high pressure chamber is open to the atmosphere, said diaphragm having its other face in communication with the low pressure chamber and subject to vacuum, and a hydraulic connection to said motor cylinder including a brake pedal and master cylinder, whereby said brake pedal actuates said valve means subject to increasing opposition of said diaphragm according to the differential pressure between the high and low pressure chambers of said pneumatic cylinder, in further combination with a hydraulic line from said master cylinder to said pump and including a check valve adapted for automatic closing to prevent the return to said master cylinder of pressure developed in said pump in excess of that developed in the master cylinder.

18. In a booster mechanism for hydraulic brakes, the combination with a pneumatic cylinder and a piston provided with packing in said cylinder and sub-dividing said cylinder into high pressure and low pressure chambers, a hydraulic brake operating pump including relatively movable piston and cylinder members, one of which is connected with said pneumatic piston to receive motion therefrom for hydraulic displacement to operate a brake, said pneumatic cylinder having a vacuum connection to its low pressure chamber, a regulating device comprising valve means for selectively placing the high pressure chamber in communication selectively with the low pressure chamber and alternatively with the atmosphere, a hydraulic motor including a cylinder and piston, the piston being connected with said valve means for the operation thereof, a diaphragm chamber provided with a diaphragm connected with said motor piston and valve means, said diaphragm chamber being operatively connected with the high pressure chamber aforesaid to be subject to atmospheric pressure when the high pressure chamber is open to the atmosphere, said diaphragm having its other face in communication with the low pressure chamber and subject to vacuum, and a hydraulic connection to said motor cylinder including a brake pedal and master cylinder, whereby said brake pedal actuates said valve means subject to increasing opposition of said diaphragm according to the differential pressure between the high and low pressure chambers of said pneumatic cylinder, in further combination with a hydraulic line from said master cylinder to said pump and including a check valve adapted for automatic closing to prevent the return to said master cylinder of pressure developed in said pump in excess of those developed in the master cylinder, and a stop disposed in the path of movement of the pump member connected with the pneumatic piston, said check valve being mounted in said member and including a stem engageable with said stop for displacement to open the valve in one extreme position of said last mentioned member.

19. In a device of the character described, the combination with at least one pneumatic cylinder having a pneumatic piston operable therein and provided with packing whereby to divide said pneumatic cylinder into two chambers, one of said chambers having a vacuum connection, a control mechanism comprising valve seats, ports and passages, and valve actuating means for selectively placing the second chamber of said cylinder alternatively in communication with the first chamber and with the atmosphere, and a slave motor comprising a pneumatic cylinder and a packed pneumatic piston reciprocable therein and dividing the slave motor cylinder into two chambers, and conduits connecting the chambers of the slave motor cylinder with respect to chambers of the pneumatic cylinder first mentioned, a hydraulic cylinder and piston connected for actuation by the pneumatic cylinder piston first mentioned, a master hydraulic cylinder connected to said hydraulic cylinder, said master cylinder also having a connection to said control mechanism for the actuation of said control mechanism, said slave motor being provided with a hydraulic cylinder and piston connected for actuation by said slave motor pneumatic piston, and a supply of hydraulic fluid separate from said master cylinder for said slave motor hydraulic cylinder.

20. The device of claim 19 in which said control mechanism comprises a control chamber communicating with said second chamber of the cylinder first mentioned, the control chamber being defined by walls having two separate ports with respect to which said valve means has relative movement, together with means for effecting such movement which includes a hydraulic motor including a hydraulic cylinder and piston members, a support to which one of said members is fixed, and a connection from the other of said members for effecting such movement.

21. The combination set forth in claim 19 in which at least one of the pneumatic cylinders has a companion pneumatic cylinder with a piston provided with a pneumatic connection to the piston of said one cylinder, and chambers having passage extensions to the respective chambers of the cylinder first mentioned.

22. In a device of the character described, a series of pneumatically connected cylinders, each comprising a pair of oppositely dished flanged pans, pneumatic pistons reciprocable in the several cylinders, diaphragms connected peripherally with the respective pneumatic pistons and clamped between the flanges of the respective pans to constitute packing for said pneumatic pistons, a hydraulic pump comprising hydraulic piston and cylinder members, one of which is connected to the several pneumatic pistons to receive motion therefrom, each of the pneumatic pistons dividing its pneumatic cylinder into high and low pressure chambers, and the said one pump member including passages connecting the several corresponding chambers of the several pneumatic cylinders of said series, a brake operating conduit leading from the other of said pump members, said other pump member being fixed to a pneumatic cylinder at the end of said series, a hydraulic operating circuit including a master cylinder and pedal operated piston therein, and a duct leading therefrom to said pump, a check valve controlling reverse flow from said pump to said duct, a vacuum connection to the low pressure chambers of the several pneumatic cylinders, control mechanism including ports and valve means for selectively coupling the high pressure chambers of the several pneumatic cylinders alternatively to the low pressure chambers and to the atmosphere, a hydraulic motor operatively connected with said valve means for the actuation thereof, and a by-pass from said master cylinder duct to said motor.

23. The combination set forth in claim 22 in further combination with a diaphragm chamber including a diaphragm connected to said motor and having one of its faces exposed to pressures in one of said chambers, and the other of its faces exposed to pressures in the other of said chambers, the differential of said pressures being exerted in opposition to the operation of said valve means by said pump.

24. A pneumatic booster for hydraulic brake operating mechanism comprising a series of pneumatic cylinders, each including a pair of oppositely dished flanged pans, a bearing collar connected between contiguous pans of consecutive cylinders, a hydraulic cylinder reciprocable through said bearing collar within the pneumatic cylinders and provided with oppositely opening cylinder cavities, pneumatic pistons in the respective pneumatic cylinders, packing diaphragms connected peripherally with said pneumatic pistons and clamped between the flanges of the pneumatic cylinders, hydraulic pistons fixed within the pneumatic cylinders at the ends of said series and engaged in the respective cavities of the hydraulic cylinder, passages extending longitudinally of the hydraulic cylinder and communicating between corresponding portions of the respective pneumatic cylinders whereby the respective pneumatic pistons will be subject to corresponding pressure differentials, hydraulic ducts extending through the respective fixed hydraulic pistons aforesaid and communicating with the respective cavities, a partition between said cavities provided with a port, a check valve in said port, a vacuum connection communicating with one of said pneumatic cylinders and through one of said passages longitudinally of said hydraulic cylinder with another pneumatic cylinder, and a control mechanism comprising valve means for selectively coupling other portions of the pneumatic cylinders with a source of vacuum and alternatively with atmospheric air, and a hydraulic connection with said valve means for the actuation thereof and having a branch connection with the hydraulic piston duct from which such check valve opens.

25. The device of claim 24 in which said control mechanism comprises a control chamber having a first port opening into one of said pneumatic cylinders and having wall portions provided respectively with second and third ports and seats, said motor being connected to effect relative movement between said seats and valve means.

26. The combination set forth in claim 24 in which said control mechanism is disposed between two of said pneumatic cylinders and encircled by a band connecting said cylinders peripherally.

27. The combination set forth in claim 24 in which said control mechanism is located remote from the pneumatic cylinders and provided with conduits leading thereto and communicating therewith at opposite sides of the respective pistons therein, said control mechanism including a control chamber having a first port opening to one of said conduits, a second port opening to the other, and a third port opening to the atmosphere, said valve means providing relative opening and closing of said second and third ports.

28. The combination set forth in claim 24 in which said control mechanism is located remote from the pneumatic cylinders and provided with conduits leading thereto and communicating therewith at opposite sides of the respective pistons therein, said control mechanism including a control chamber having a first port opening to one of said conduits, a second port opening to the other, and a third port opening to the atmosphere, said valve means providing relative opening and closing of said second and third ports, said control mechanism further including a hydraulic motor comprising said hydraulic connection and a diaphragm connected with said valve means in opposition to the motor operated displacement thereof and communicating on one face with the first port and on the other face with the second port, whereby to be subject to a differential corresponding to that existing in the pneumatic cylinders.

FRANK ADAMS.

References Cited in the file of this patent
UNITED STATES PATENTS

| Number | Name | Date |
|---|---|---|
| 1,472,801 | Loughead | Nov. 6, 1923 |
| 2,289,043 | Rockwell | July 7, 1942 |
| 2,305,638 | Rockwell | Dec. 22, 1942 |
| 2,322,739 | Vanderzee | June 22, 1943 |
| 2,352,357 | Almond | June 27, 1944 |
| 2,353,755 | Price | July 18, 1944 |
| 2,383,082 | Rossmann | Aug. 21, 1945 |
| 2,393,524 | Fant | Jan. 22, 1946 |
| 2,406,328 | Gunderson | Aug. 27, 1946 |
| 2,434,588 | Rockwell | Jan. 13, 1948 |
| 2,470,748 | Thomas et al. | May 17, 1949 |
| 2,587,803 | Adams | Mar. 4, 1952 |

FOREIGN PATENTS

| Number | Country | Date |
|---|---|---|
| 329,680 | France | June 16, 1903 |